US012500771B2

(12) United States Patent
Norman

(10) Patent No.: US 12,500,771 B2
(45) Date of Patent: Dec. 16, 2025

(54) SYSTEM FOR AUTHENTICATING AND/OR IDENTIFYING A USER

(71) Applicant: onGRID Sports Technology GmbH, Berlin (DE)

(72) Inventor: Simon Norman, Wiesbaden (DE)

(73) Assignee: onGRID Sports Technology GmbH, Berlin (DE)

( * ) Notice: Subject to any disclaimer, the term of this patent is extended or adjusted under 35 U.S.C. 154(b) by 249 days.

(21) Appl. No.: 18/028,070

(22) PCT Filed: Jun. 25, 2021

(86) PCT No.: PCT/EP2021/067572
§ 371 (c)(1),
(2) Date: Mar. 23, 2023

(87) PCT Pub. No.: WO2022/063452
PCT Pub. Date: Mar. 31, 2022

(65) Prior Publication Data
US 2023/0334128 A1 Oct. 19, 2023

(30) Foreign Application Priority Data
Sep. 24, 2020 (DE) .......................... 102020124996.9

(51) Int. Cl.
*H04L 9/32* (2006.01)
*G06F 21/31* (2013.01)
(Continued)

(52) U.S. Cl.
CPC ............ *H04L 9/3226* (2013.01); *G06F 21/31* (2013.01); *G06F 21/35* (2013.01); *G07C 5/008* (2013.01);
(Continued)

(58) Field of Classification Search
CPC .......... G06F 21/35; G06F 21/31; G06F 21/62; H04L 63/102; H04L 63/1491;
(Continued)

(56) References Cited

U.S. PATENT DOCUMENTS

| 2004/0230809 | A1* | 11/2004 | Lowensohn | ............ G06F 21/35 |
| | | | | 713/186 |
| 2007/0003919 | A1* | 1/2007 | Stevenson | .......... G09B 19/0038 |
| | | | | 434/350 |

(Continued)

FOREIGN PATENT DOCUMENTS

WO   WO 2019/191215 A1   3/2019

OTHER PUBLICATIONS

Search Report and Written Opinion received in International Application No. PCT/EP2021/067572 dated Sep. 15, 2021.

*Primary Examiner* — Kyung H Shin
(74) *Attorney, Agent, or Firm* — Knobbe Martens Olson & Bear LLP

(57) ABSTRACT

The present invention relates to an authentication and/or identification system (10) for authenticating and/or identifying a user, with
  at least one storage module (22);
  at least one authentication and/or identification element (40) that is uniquely assigned to a user;
  at least one input and data collection module (24) which is not accessible to the user and by means of which the authentication and/or identification element (40) can be created and/or modified; and
  at least one output module (50), by means of which the authentication and/or identification element (40) can be read and/or displayed.

Figure 1:
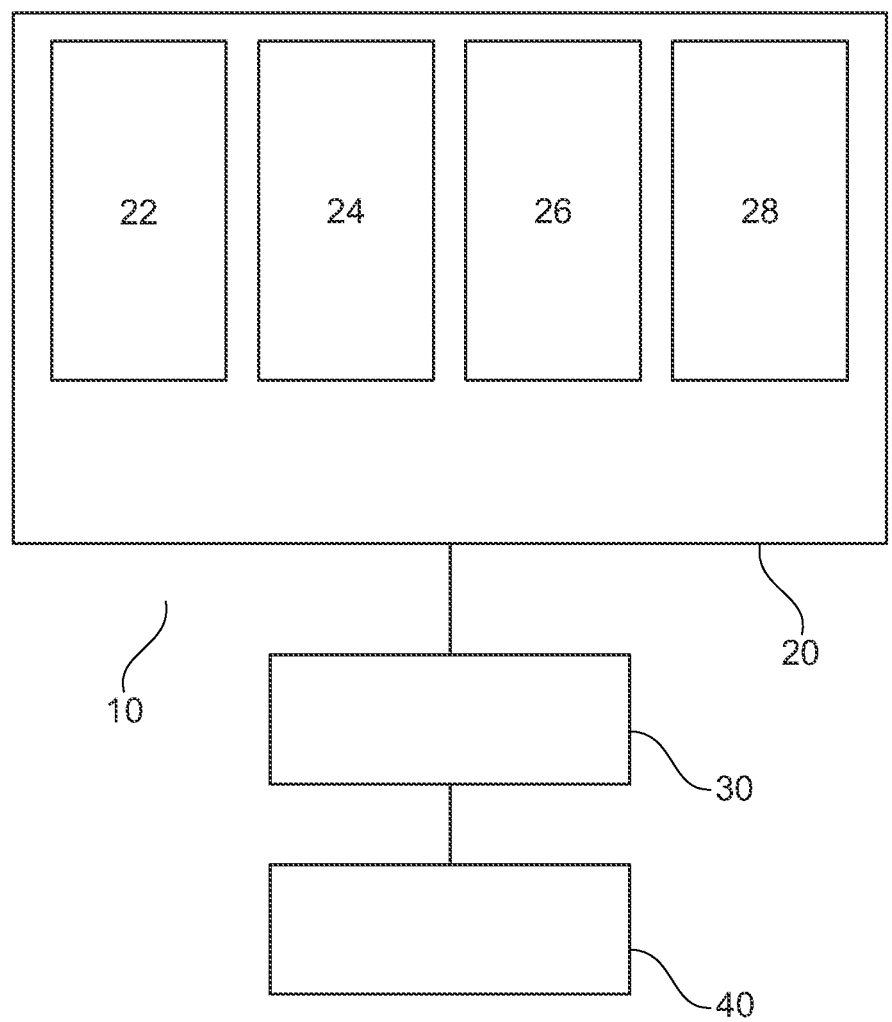

Furthermore, the present invention relates to a method therefor and to the use of the authentication and/or identification system (10) for authenticating and/or identifying a
(Continued)

user and/or for implementing a digital and/or electronic sports equipment and/or sports device passport.

14 Claims, 7 Drawing Sheets

(51) Int. Cl.
  *G06F 21/35* (2013.01)
  *G07C 5/00* (2006.01)
  *G09B 19/00* (2006.01)
  *H04L 9/40* (2022.01)

(52) U.S. Cl.
  CPC ........ G09B 19/0038 (2013.01); H04L 63/102 (2013.01)

(58) Field of Classification Search
  CPC ... H04L 45/308; H04L 45/22; H04L 63/1425; H04L 63/08; H04L 9/3226; H04L 9/3236; H04L 9/3231; G09B 19/0038; G09B 7/02; G07C 5/008; G07C 5/0825; G07C 5/0816; G07C 5/02
  See application file for complete search history.

(56) References Cited

U.S. PATENT DOCUMENTS

| | | | |
|---|---|---|---|
| 2007/0118891 A1 | 5/2007 | Buer | |
| 2018/0294966 A1* | 10/2018 | Hyun | H04L 9/3226 |
| 2019/0372982 A1* | 12/2019 | Satija | H04L 63/102 |
| 2020/0090423 A1* | 3/2020 | Hößle | G07C 5/008 |

* cited by examiner

SYSTEM FOR AUTHENTICATING AND/OR IDENTIFYING A USER

The invention relates to a system for authenticating and/or identifying a user and a method for operating the system, in particular in the field of semi-professional sports or professional sports or also generally for licenses or driving licenses, identity cards, etc.

Authentication systems are already known from the prior art.

For example, US 2017/0149560 A1 discloses an authentication system for accessing a database system with multiple computers connected by network.

Another authentication system using blockchain or distributive ledger technologies (DLT) is known from US 2017/0330179 A1.

In the case of ID cards, it is also already known to use cryptographic encryption techniques to verify ID cards. EP 2477352 A1 describes such a method and the associated system.

DE 10003057 A1 discloses a system for verifying access badges and a corresponding access badge.

In many areas of life, it is necessary to identify oneself clearly or even unambiguously and, if necessary, to show appropriate qualifications through licenses or corresponding training certificates in order to be able to carry out activities or gain access to courses or events.

This is especially true in semi-professional or professional sports, there is a need to identify a person, verify an authorization to participate in certain events, and retrieve any restrictions or supplemental information.

One use case is competitions that are hosted, for example, in connection with a sports league. For example, sports leagues maintain directories of members, individuals, and clubs that are allowed to participate in certain events or in events of a certain category. For this purpose, data is collected on the individual as well as on previous participation results, registrations, payments, qualifications and other features and attributes of individuals and groups of individuals.

In known systems, one challenge is to keep the data about a user up to date and to perform authentication and/or identification quickly and efficiently.

Both in the field of licensed players in ball sports and, for example, in motor sports, these verifications and the corresponding licenses of a user are largely paper-based.

It is therefore a task of the present invention to further design a system and a method of the type mentioned at the beginning in an advantageous manner, in particular to the effect that authentication and/or identification of a user is facilitated and more efficient operation is made possible.

This task is solved by a system of the type mentioned at the beginning with the features of claim 1. According to this, it is provided that an authentication and/or identification system for authenticating and/or identifying a user is provided with

- at least one storage module;
- at least one authentication and/or identification element that is uniquely assigned to a user;
- at least one input and data collection module which is not accessible to the user and by means of which the authentication and/or identification element can be created and/or modified; and
- at least one output module by means of which the authentication and/or identification element can be read out and/or displayed.

The invention is based on the basic idea that the system for authenticating and/or identifying a user is advantageously paperless and in particular fully digital and in particular electronic. The data for a user should be stored centrally in the memory module or via several decentralized storage locations (if the memory module consists of several decentralized units, e.g. several memory servers) and his identity data and other properties such as qualifications or also e.g. locks or also medical data should be stored there. Centrally (and/or also decentrally, e.g. distributed over several servers), an authentication and/or identification element can then be created for the user, which can then be matched decentrally (i.e. e.g. on site at an event) against the data held in the central storage module in order to perform authentication and/or identification. The output module is then used for this purpose, with which the authentication and/or identification element can then be read out and/or displayed. It is conceivable here that one uses control posts (either represented by control persons or by appropriate machine control posts), which are provided with the output module and that over this the authentication and/or identification can take place. This can then be done either manually by control persons and by displaying and comparing the data (e.g. according to a traffic light system) and/or semi-automatically or automatically by corresponding machine control posts.

The authentication and/or identification system for authenticating and/or identifying a user can be used in particular in the field of semi-professional sports or professional sports or also generally for licenses or driver's licenses, ID cards, etc. Conceivable, for example, is the use for license certificates in motor sports, cycling, license player cards in sports leagues such as football, handball, basketball, golf (here handicap and Platzreife), but also, for example, in hunting and/or fishing e.g. i.e. digital and forgery-proof gun ownership cards, hunting licenses, hunting patents, hunting licenses, fishing licenses (also transnational, e.g. several hunting permits in different countries in the same period, e.g. hunting permits in the home country and simultaneous hunting trips abroad).

The memory module can be set up, for example, to hold at least one, but in normal operation a plurality of authentication and/or identification elements, i.e. to store and/or provide identification data and/or authorization data assigned to the user. For example, the storage module is set up to store personal data of a user. Further, other elements for authentication and/or identification of the user may be stored there. Further, information about a past participation of the user in defined events and his results obtained thereby may be stored. Furthermore, an assignment of the user to certain groups or categories of users may be stored.

Furthermore, it can be provided that the storage module is designed as a central and/or decentralized storage module. This advantageously achieves particularly flexible and efficient management of the relevant data.

The storage module may be comprised of an external server, for example.

If the storage module is designed centrally, then the storage and/or provision of relevant data is carried out, for example, by a single central storage module or coordinated by such a central storage module, to which, however, several further subunits may be assigned.

If the storage module is decentralized, then the storage and/or provision of relevant data can be carried out by at least two separate storage modules, such as different external servers of the system. It may be provided that a database is stored in its entirety at different storage modules and/or that different parts of a database are stored at different storage modules. In particular, different decentralized storage modules store different parts of a database; in particular, in this case the request data is transferred to only one relevant decentralized storage module and/or the release data is provided by one relevant storage module.

In the case of a decentralized memory module, provision can be made for synchronization of the data stored for a user between at least two memory modules, in particular between all memory modules of the system.

In particular, a decentralized storage unit can provide for the verifiable storage of data by means of a blockchain process, whereby in particular changes can be documented by means of a cryptographic process and manipulations can be prevented or made detectable.

Blockchain methods may be used in different modules of the system and/or at different stages of the method for its operation. For example, cryptographic verification and/or security using a blockchain method may be performed on the storage module, the authentication and/or identification element, the verification module (see in particular below), and/or a user device for implementing an element of the system.

The authentication and/or identification element can consist in particular of a data record created by means of the input and data collection module. The data record can be electronic or digital. It is conceivable that the data record is encoded and secured, for example, by means of a cryptographic process such as blockchain or a process from the field of distributed ledger technology (DLT).

For example, a process from the field of distributed ledger technology (DLT) can be used, such as a blockchain process, to cryptographically secure the integrity of the data and the traceability of previous changes.

Besides Blockchain, alternative or additional methods are IOTA or Hashgraph. Other examples are Ethereum, Hyperledger, Corda, Openchain, BigChainDB, etc.

The term distributed ledger technology (DLT) refers to a technique used for documenting certain transactions. In contrast to the classic approach, in which a ledger is generally managed by just one instance, DLT involves different parties maintaining any number of copies of the ledger, which are in principle identical, in a decentralized manner. Appropriate measures are taken to ensure that new transactions are added to all copies of the ledger and that there is consensus on the current status of the ledger.

For example, DLTs differ in the way networked computers come to an agreement (i.e., consensus protocols), something through proof of work as in Bitcoin, proof of economic interest (proof of stake, as in Ethereum's Casper), a coordinator as in Raft, or elections as in Swirlds.

There are public DLTs (anyone can participate in the network and view the data) and private DLTs (which grant access and participation only to a limited group).

In public DLTs, there are various servers that mine or participate in the calculation of checksums and authentication, are also remunerated for this (e.g., in Bitcoin), and confirm the transaction.

In particular, the authentication and/or identification element can be designed to provide a verification unit (such as the verification module described below) with the necessary information for generating the request data and/or for authentication and/or identification based on the received release data. For example, it serves as a badge for the user, wherein the verification unit generates the request data based on the information captured by the authentication and/or identification element in such a way that the memory module can use this data to perform the authentication and/or identification and generate and provide the corresponding release data.

For example, the request data may include a request of the content whether a certain person, such as the owner of the authentication and/or identification element, is authorized to compete in a sports event and/or what conditions must be met in doing so.

As mentioned above, the system can be, among others, an in-house developed DLT system or a public DLT system such as Blockchain.

Furthermore, it is conceivable that the authentication and/or identification element is deposited on an identification card and/or a badge and/or an app (in particular on a mobile terminal such as a smartphone and/or tablet) of the like. The deposit on such a (physical) means of authentication can, for example, take place on a memory chip or a magnetic strip, via mobile app by NFC, barcode or via Bluetooth or in any other suitable manner. It is also conceivable that a graphic display element is additionally provided here, for example on the identification card. This can advantageously provide an element by means of which a user can identify himself in a particularly simple manner.

An identification card can, for example, be designed as a plastic or paper card in a manner known per se. Data can be stored, for example by means of an imprint or a graphic representation. For example, a barcode or a comparable code can be used as a graphic representation for storing and providing data.

Preferably, the authentication and/or identification element is implemented in the form of an app (i.e., software for a mobile device such as a smartphone or tablet PC) that is available to the user (e.g., the player, driver, or person who wants to authenticate himself and prove his qualification).

This makes it particularly advantageous to control authentication via an app that is made available to every user. It is conceivable to make the basic app available for download free of charge and to enable license purchases, registration in events, purchase of authorizations, etc. via in-app purchases. In the app or in a storage accessible via the app, e.g. a cloud storage, both the licenses and/or driving authorizations and/or permits and/or other authentication information are stored, as well as the medical data with which the user can uniquely authenticate himself, supplemented by biometric data (e.g. for facial recognition and/or fingerprint and/or retina scan, etc.).

It is also conceivable that it is an identification card in the broader sense, such as a badge made of plastic (identification tag, e.g. in the form of a round tag, etc.), or also an element incorporated into an item of clothing or a protector (e.g. in a helmet).

It can be designed as a smart card with an integrated electronic circuit, such as an integrated circuit, printed circuit, RFID (radio-frequency identification), near field communication (NFC) chip, or other module.

Further, the authentication and/or identification element may comprise at least one security feature, such as a hologram or a chip for providing tamper-proof data, such as by means of cryptographic methods (e.g., blockchain methods).

The authentication and/or identification element may further comprise a graphical display element, in particular output from a display unit, such as on a display. For example, the display element may be output from a portable computing device, such as a cell phone or tablet computer.

The display element may comprise, for example, a barcode or comparable machine-readable representation containing encoded information.

The display element may be static or it may be regenerated for an operation performed by means of the authentication and/or identification element.

The authentication and/or identification element may further comprise a physical or virtual token. A token may be an object to which the function of the authentication and/or identification element is attached. A token may further comprise a virtual object, such as a signature file, one or more hash values, a password, an image, a file, or other object. In the case of a virtual token, a cryptographic method may further be used, particularly to confirm the identity of a user, such as when the user is required to provide a password, or to ensure that the token is current and not out of date.

Such a token can be exchanged wirelessly via Wifi, Bluetooth, RFID or NFC, for example.

In the system, the input and data collection module is not accessible to the user, but only to an authorized person. The user can generally only gain access indirectly by proving authorization, such as through a procedure for logging in to a specific user account or through other proof of authorization.

In particular, the input and data collection module has an interface that allows data to be captured and/or read in that is stored by the memory module and is relevant for authenticating and/or identifying the user. For example, this can be done via an interface designed as a software module. An input of data can be captured using an app or other computer application.

Furthermore, the input and data collection module can capture data automatically, for example via an interface to a database. For example, events associated with a user and results achieved can be captured. Further, other qualifications and/or features of the user may be captured.

Data assigned to a user and stored in particular by the memory module can be updated automatically. An external database can be accessed for this purpose. For example, it can be checked regularly or triggered by certain events whether data is up to date. Furthermore, an external database can be set up to transmit information about a change in certain data to the input and data collection module, where an update is then initiated.

In the system, the input and data collection module is designed to be used to create and/or modify the authentication and/or identification element. This can be done in a variety of ways. For example, the input and data collection module may generate and output information for producing a physical authentication and/or identification element, such as data printed or stored on an identification card. Further, a virtual authentication and/or identification element may be generated by means of the input and data collection module, such as a digital file, certificate, barcode or other machine-readable encoding, image, security feature, or other suitable information.

The verification module of the system may capture the authentication and/or identification element. That is, it may acquire at least certain data associated with the authentication and/or identification element, such as by reading an information carrier in various ways.

In this context, the verification module may comprise, for example, a reader for reading and/or capturing the authentication and/or identification element. For example, the verification module may be designed as a software module of a reader, such as a mobile device of a user, such as a cell phone or a mobile device with a sensor unit and a computing unit, or it may be designed as a stationary device, such as at a barrier, a turnstile, a gate or another access restriction.

If the authentication and/or identification element is designed with a graphic display element, detection by the verification module can be carried out optically in particular, for example by means of a camera or a scanner. This is advantageously particularly simple, since cameras are also widely used in mobile user devices and the optical connection can be established very easily.

In a further embodiment, the authentication and/or identification element may further comprise a non-graphical data element, such as a radio signal, provided by the authentication and/or identification element and received by the verification module. For example, data may be transmitted using near field communication. Processing of the transmitted data may be performed in a manner similar to optical transmission of corresponding information via a graphical display element.

Furthermore, it can be provided that the authentication and/or identification system has at least one verification module by means of which the authentication and/or identification element can be verified, in particular can be verified automatically.

This advantageously achieves a particularly clearly structured and reliable recording, management and provision of all relevant information. Furthermore, authentication and/or identification can be performed particularly efficiently and securely.

Furthermore, it is conceivable that the verification module is set up to generate request data on the basis of the detected authentication and/or identification element and to transmit this to the memory module, with a release data generation module also being provided, by means of which release data is generated on the basis of the request data and the data on the respective user held in the input and data collection module and is forwarded to the verification module for verification.

Such an exchange of request data and release data, which may also be secured with cryptographic methods, makes it possible to compare data in a particularly secure and tamper-proof manner.

It can also be provided that the request data generated by the verification module includes an assignment of the user to a specific category. This advantageously enables more efficient data matching and verification, since the categorization enables the user's authentication and/or identification to be reviewed directly in the corresponding data record category.

For example, a category may include such users who are authorized to participate in certain events. Further, such users may be associated with a common category that have a particular eligibility, qualification, or restriction. Further, categories may correspond to particular events that may be associated with a user, such as because a user participated in an event. Furthermore, the assignment of a user to a category may be linked to certain features and/or prerequisites, which may be firmly linked to the person of the user or may be variably pronounced.

In addition, at least one class of categories can be defined in such a way that a user is assigned to exactly one category. Furthermore, a class of categories can be defined in such a way that a user is assigned to several categories and optionally also to no category.

For example, the request data may be formed to verify the user's admission to participate in an event, where admission is tied to membership in a particular class or category of users.

In addition, it can be provided that the authentication and/or identification system is set up to at least partially generate the request data and/or the release data by means of a cryptographic process, in particular a blockchain process. This advantageously achieves a particularly high level of security, since various data, their changes and further events are cryptographically linked to one another in such a way that manipulations are prevented.

In the method, the release data is generated as a function of the request data. In particular, the information required to answer the query is determined as a function of the query data, and this necessary data is transmitted with the release data. This enables data protection requirements to be met, for example. This also makes it possible, for example, to process particularly sensitive data such as medical data in this way.

For example, the release data may be formed to include only a positive or negative result of a request. It may further comprise additional information, such as a reason for a positive or negative result. It may further comprise additional information associated with the user, such as additional conditions for a release.

Furthermore, it is possible that the verification module is further set up to generate and output a release information based on the received release data. Advantageously, this enables a user to recognize the result of the authentication and/or identification of the user particularly quickly and easily. It would be conceivable, for example, to display the user data as release information in order to enable a corresponding release. This can also be combined with a traffic light to enable an intuitive output of the release information. The release information can be positive release information (e.g. user is authorized, status "green", set to "green" if a "traffic light" is used), negative release information (e.g. user is not authorized, for example due to a suspension or medical reasons or financial reasons (e.g. (e.g., fees not yet paid), set to "red" if a "traffic light" is used) or a status that needs to be clarified, where information still needs to be clarified separately (e.g., user status not clear, set to "yellow" if a "traffic light" is used). It is also conceivable that the system only works in binary mode, i.e. there is either a release (status "green") or not (status "red").

Thus, the release data may include various information, such as a positive or negative result, and possibly also a conditionally positive or negative result. They may further comprise information about features assigned to the user, such as an authorization to participate in events for different classes or an authorization to use certain facilities. They may further include an authorization to drive for a particular category of events. They may further comprise medical data associated with the user. They may further include data about a permanent or temporary suspension of the user.

In particular, it is conceivable that the enable output comprises a graphical enable signal element that includes a colored output parameter formed as a function of the enable data. This advantageously provides an output that is particularly easy to detect.

In an advantageous embodiment, the release signals are only visible in the background for the organization or the operator of the system, e.g. for the ASN or the promoter. The user has no access to the release output.

For example, the release output can be in the manner of a traffic light, where different colors can indicate a positive (green), negative (red), and optionally a conditional (yellow) result.

A conditional result of the authentication and/or identification can be present if further data must be provided and/or a certain condition must be met in order to achieve a positive release. Furthermore, a negative result that is foreseeable for the future can be indicated under certain conditions, for example if a payment has to be made in order to obtain the positive release in the future as well.

It may further be provided that the system further comprises an application module configured to detect user input, generate change data in response to the user input, and change authentication and/or identification data stored with the storage module based on the change data.

Advantageously, this makes it particularly easy to update the data assigned to a user stored in the memory module. Furthermore, the user can be provided with an interface by means of which he can influence the memory module even without having direct access to it.

For example, the change data includes a request for a change in the identification data and/or authorization data associated with the user. For example, the request data may be transmitted to an approval authority, such as an authorized user, and depending on an approval from the approval authority, the authentication and/or identification data may be changed.

Making a change to the identification data and/or authorization data associated with the user may further be managed by means of a blockchain process, in particular to ensure that the change has been made effective for each subsequent authentication and/or identification.

In particular, the application module is further configured to identify the user, for example by means of a login, by capturing an access key or access code, by verification by means of blockchain or by other means that can ensure that the user input is made by an authorized person. In a further embodiment, the user input may also be captured automatically and/or by a computing unit. Again, analogous to the capture of a user input from a person, an identification and verification of the authorization to make the input may be performed.

In particular, the change data shall include a request or application to make the change. The change data may include information about the type of change to be made. It may further include information about a reason for that change and/or evidence of a change authorization. For example, a specific document is required to have a specific change made, such as a document for a payment, a defined event, or a change authorization tied to a specific person or organization.

Furthermore, the present invention relates to a method for authenticating and/or identifying a user. Thereby, it is provided that method for authenticating and/or identifying a user, is performed with the following steps:
- an authentication and/or identification element which is uniquely assigned to a user; is generated by means of at least one input and data collection module (24) which is not accessible to the user and by means of which the authentication and/or identification element (40) can be created and/or changed; and
- at least one output module (50) is provided, by means of which the authentication and/or identification element (40) can be read out and/or displayed.

In particular, the method is designed to operate the system. It therefore has the same advantages as the system described.

The invention further relates to a use of the described system for determining a user's eligibility to participate, in particular in a sports event.

In particular, a licensing system is provided for a large number of users, with the users being assigned categories depending on which users may be authorized to participate.

The invention further relates to a use of the authentication and/or identification system described above for implementing a digital and/or electronic sports equipment and/or sports device passport, in particular a motor vehicle passport (or so-called car passport).

Further details and advantages of the invention will now be described with reference to an example embodiment shown in more detail in the drawings.

Figure 2:
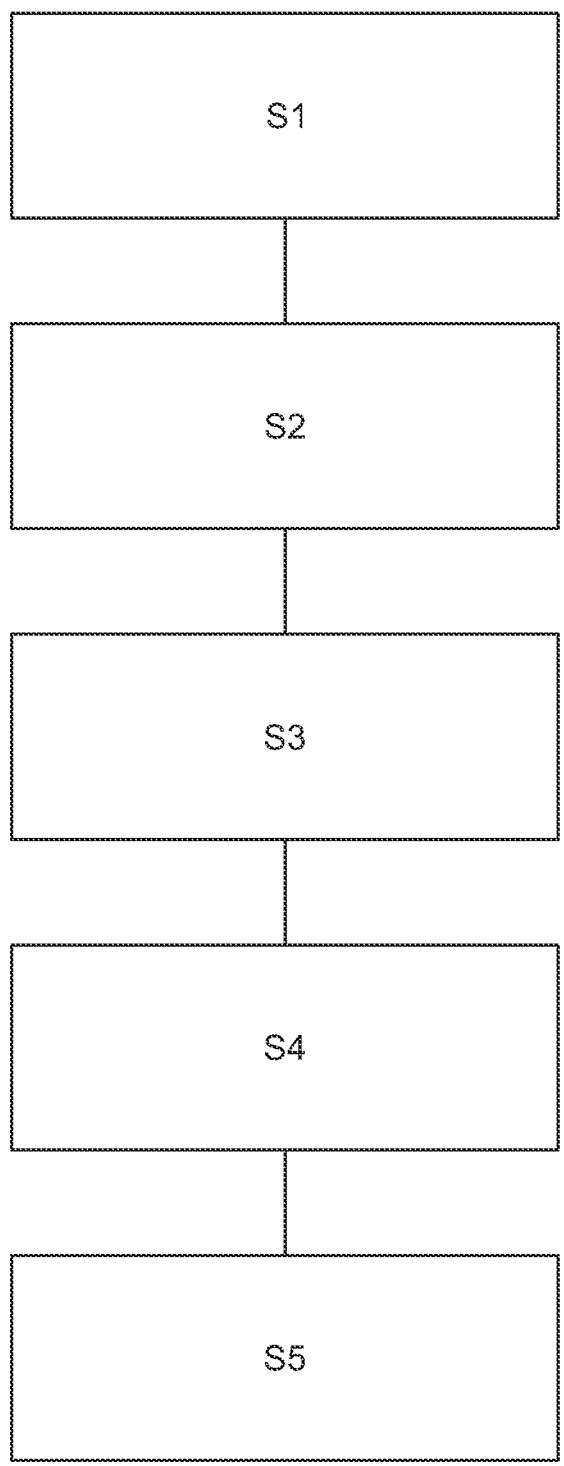
Figure 3:
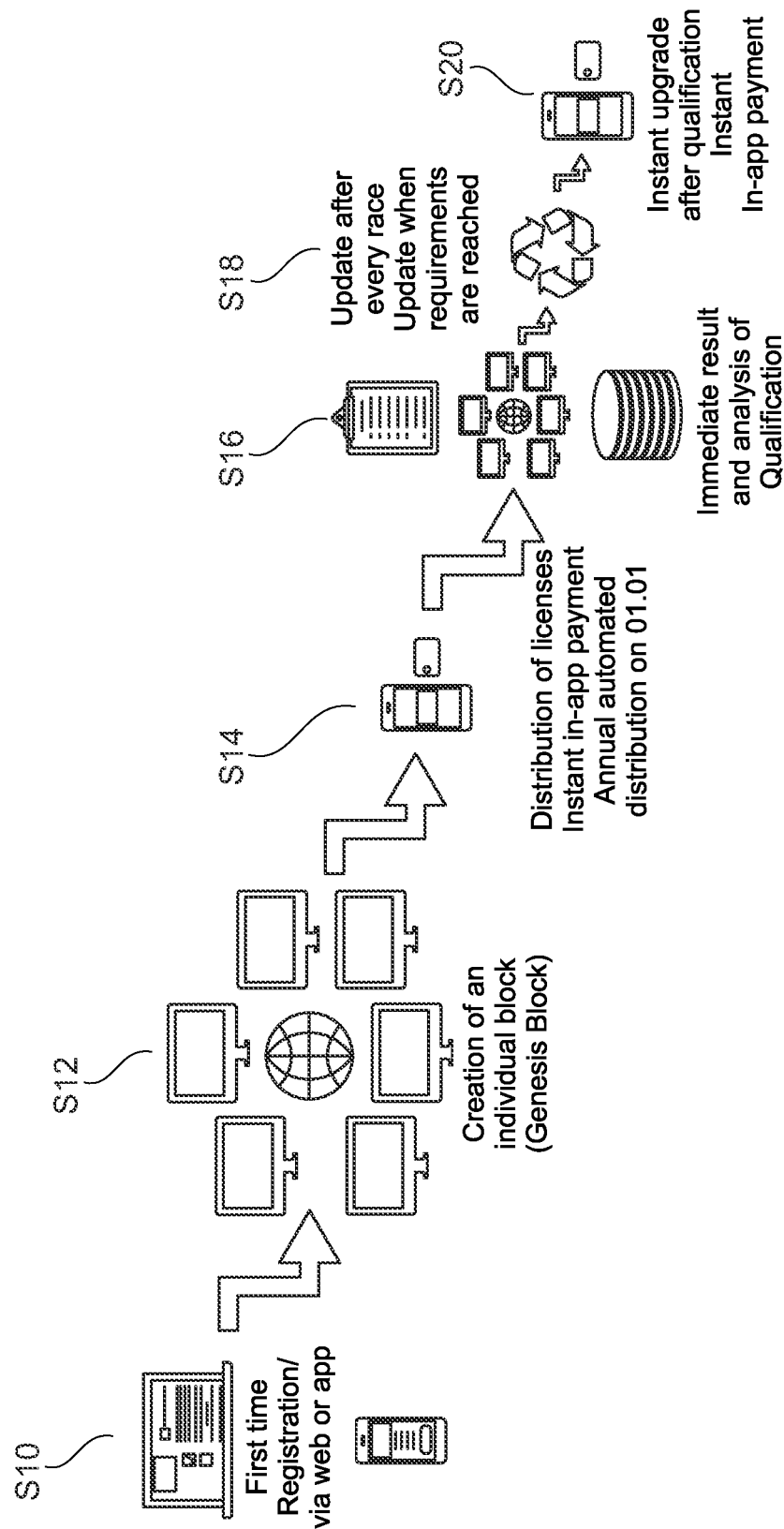
Figure 4:
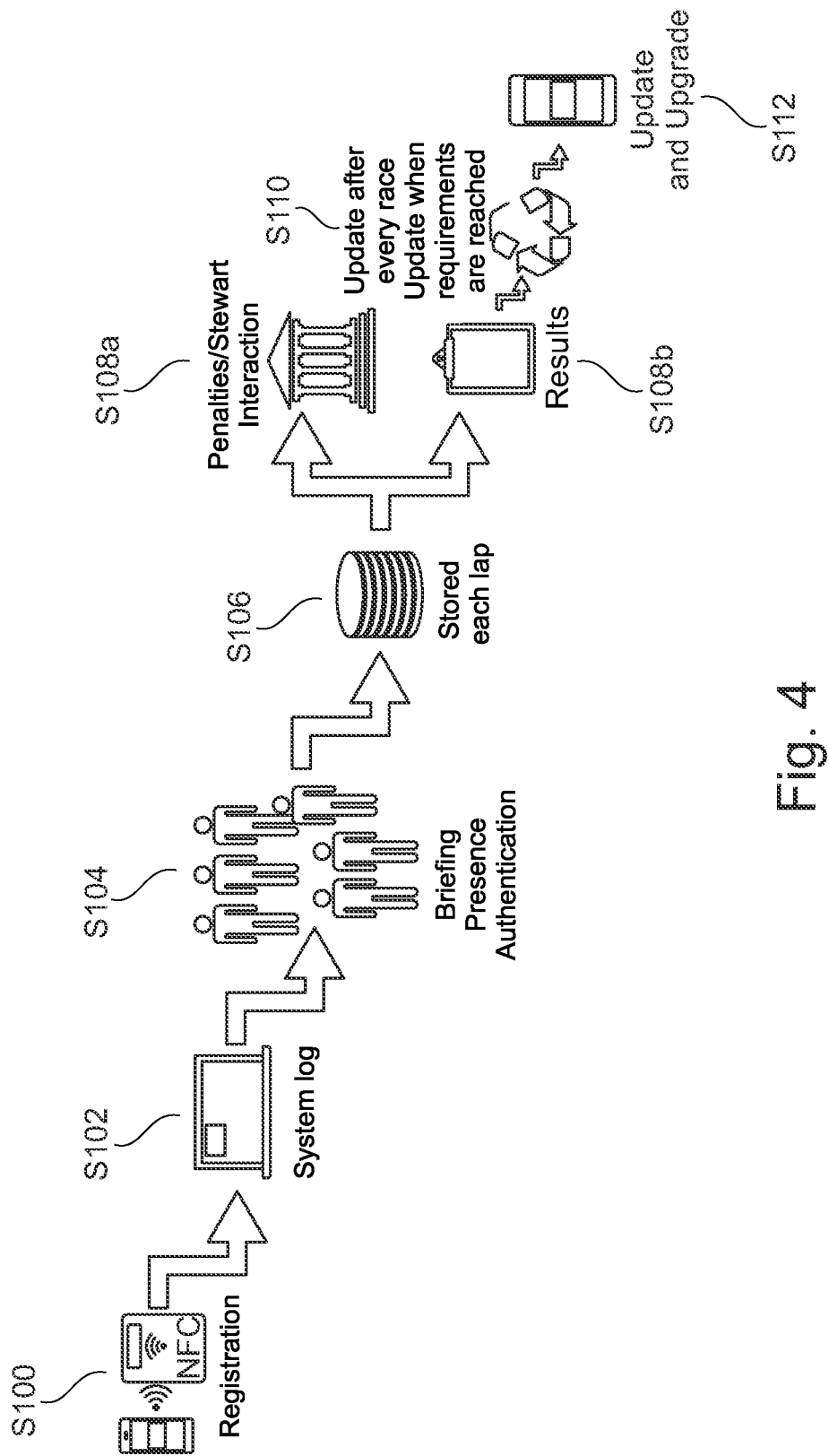
Figure 5:
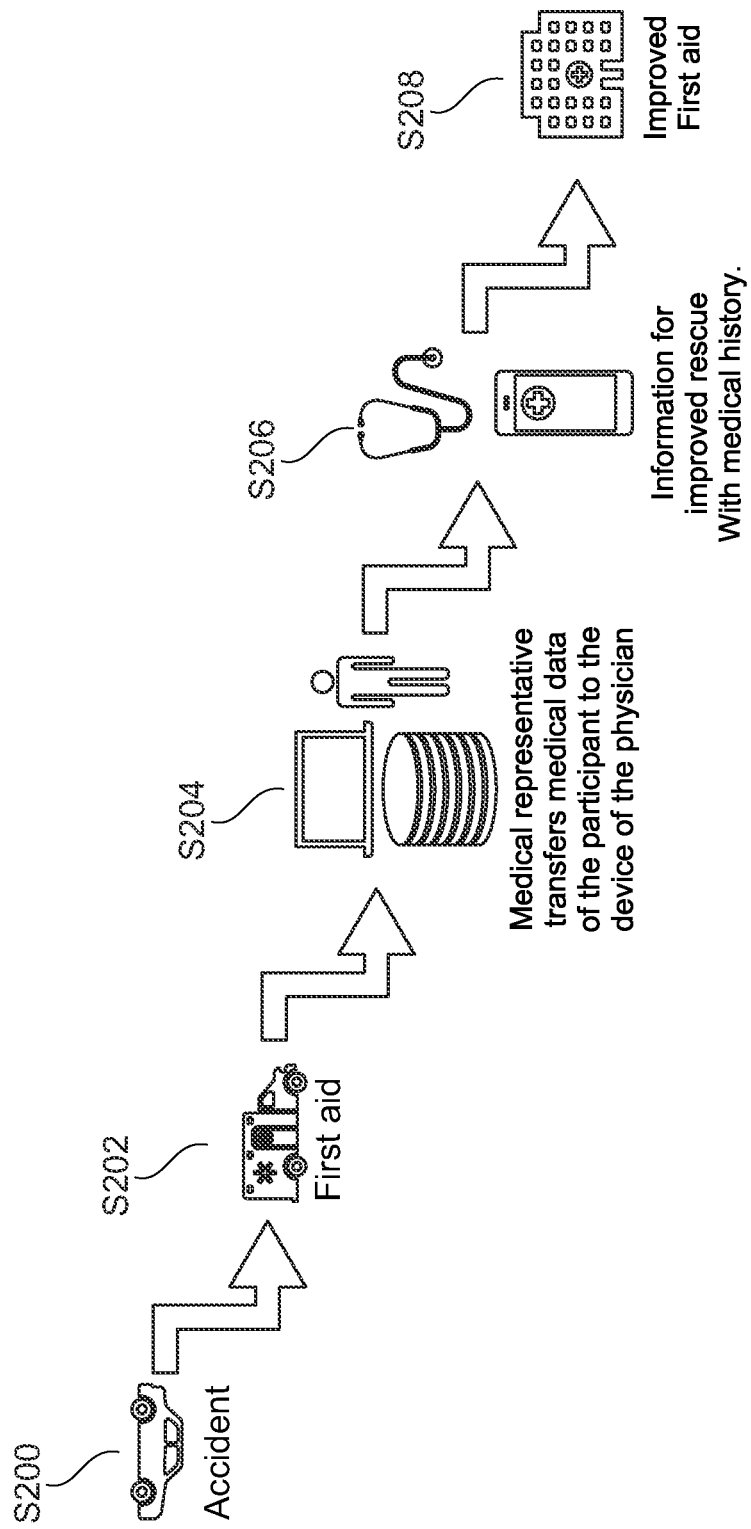
Figure 6:
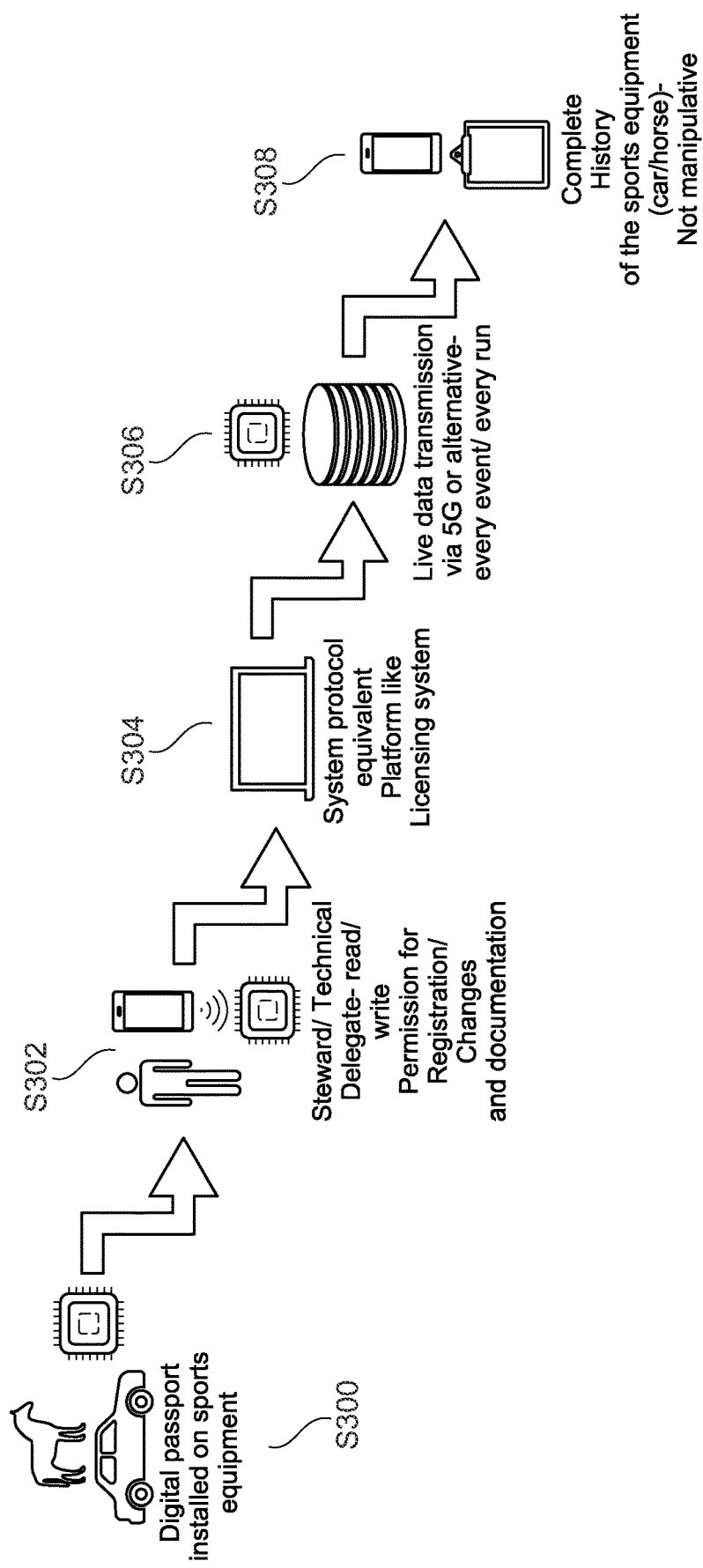
Figure 7:
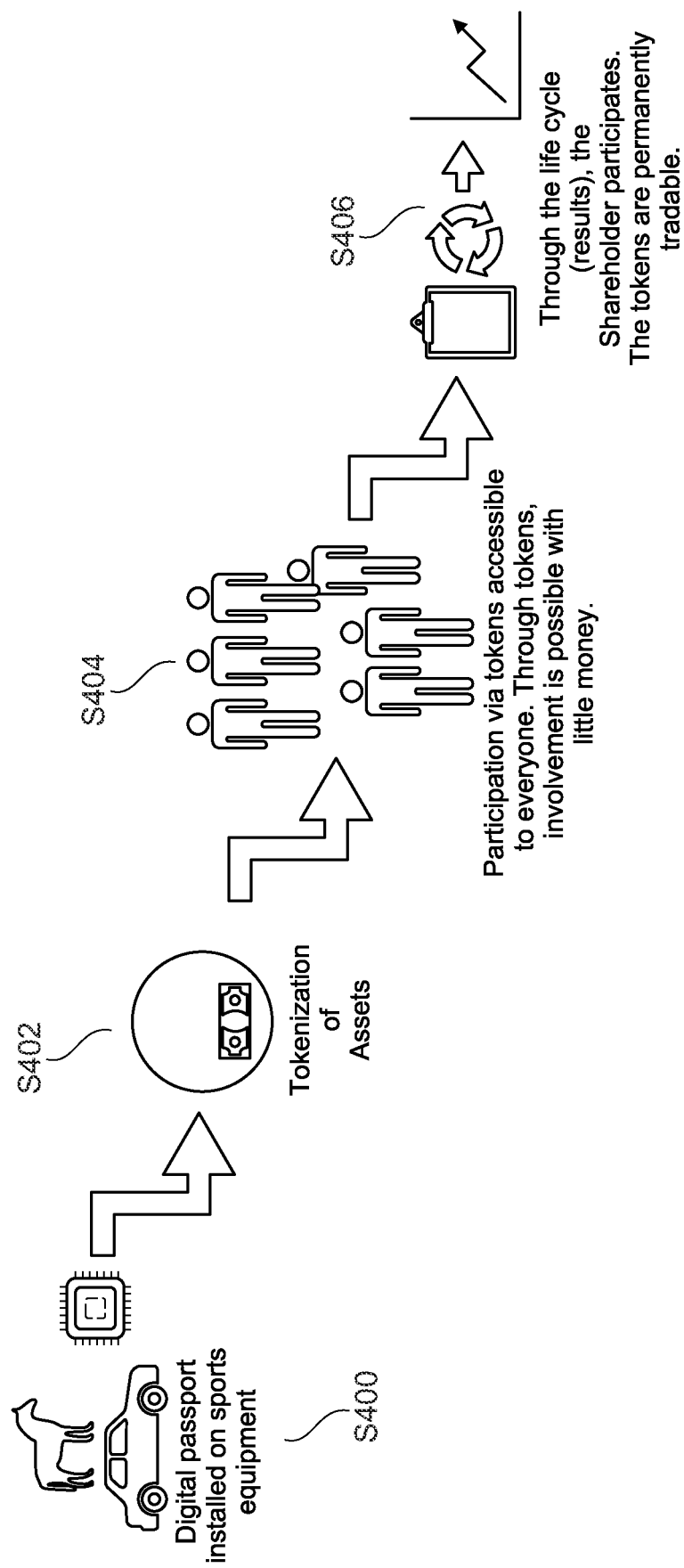

It shows:

FIG. 1 An example embodiment of an authentication and/or identification system according to the invention in connection with an example embodiment of the method according to the invention;

FIG. 2 an example embodiment of the method performed with the system according to FIG. 1;

FIG. 3 a schematic flow of the use of the system according to the invention for the initial registration and license renewal ("first time registration process & annual distribution process-digital licensing");

FIG. 4 a schematic flow of the use of the system according to the invention for a registration for a sports event ("registration process-digital licensing");

FIG. 5 a schematic sequence of the use of the system according to the invention in a medical emergency ("medical use case-digital licensing");

FIG. 6 a schematic flow of the use of the system according to the invention for an implementation of a digital sports equipment pass ("Digital Car/Sport Equipment Pass-digital licensing"); and FIG. 7 a schematic flow of the use of the system according to the invention for an implementation of a tokenization of an asset class ("Digital Car/Sport Equipment Pass/Tokenization-digital licensing").

FIG. 1 shows an example embodiment of an authentication and/or identification system 10 according to the invention in connection with an example embodiment of the method according to the invention.

The system 10 includes an external server 20.

In turn, in the example embodiment, the external server comprises a storage module 22, an authorization data generation module, an input and data collection module 24, a request module 26, and a control module 28. In further example embodiments, any or all of these modules 22 to 28 may be comprised by separate units or otherwise formed as separate units.

The system 10 further comprises a verification module 30.

The system 10 further comprises an authentication and/or identification element 40.

In the example embodiment shown, the authentication and/or identification element comprises a data record created by means of the input and data collection module. The data record is electronically stored on an identification card. It is conceivable that the data record is encoded and secured, for example, by means of a cryptographic method such as blockchain.

In particular, the authentication and/or identification element can be designed to provide a verification unit (such as the verification module described below) with the necessary information for generating the request data and/or for authentication and/or identification based on the received release data. For example, it serves as a badge for the user, wherein the verification unit generates the request data based on the information captured by the authentication and/or identification element in such a way that the memory module can use this data to perform the authentication and/or identification and generate and provide the corresponding release data.

In the example, the verification module 30 is formed as a software module by means 5 of which a reader for detecting the authentication and/or identification element 40 is controlled. In the example, the identification card 40 is read in by reading information provided by a chip of the identification card 40 via near field communication (NFC). Alternatively or additionally, information can be captured optically, in particular a barcode or other machine-readable information representation printed on the identification card 40.

In further examples embodiments, the authentication and/or identification element 40 may be formed in other ways, such as comprising an output element that is outputable by an output device of a user. This may comprise a visually detectable display, such as an image, a numeric and/or text display, a barcode, or other graphically encoded information output. Alternatively or additionally, there may be an electronically detectable output, such as a transmission of data by means of methods known per se, for example via a cable or contactless via Bluetooth, NFC, WiFi, by radio, inductively or by other means.

Between the external server 20 and the verification module 30 there is in the example at least temporarily a datatechnical connection, which is established in a manner known per se. In the present example, these modules 20, 30 are connected to a common network over which the data technology connection is established, in particular the Internet and/or a mobile network. In various examples embodiments, wireless and wired connections may be provided.

With reference to FIG. 2, an example embodiment of the method is described. This is based on the example embodiment of the system described above, which in turn is specified in more detail by the following explanations.

In the example embodiment, it is provided that the control module 28 controls the activation of the memory module 22, the input and data collection module 24, and the application module 26, as well as any interfaces of the external server 20.

In a step S1, an authentication and/or identification element 40, is created for a user. In the example embodiment, a user requests the creation of the authentication and/or identification element 40 using the request module 26.

The input and data collection module 24 creates the authentication and/or identification element 40, or provides the data necessary to do so, which is then transmitted to a card printer, for example, which creates an identification card and prints information associated with the user thereon, and provides a chip with information associated with the user.

In principle, however, everything can also be done fully digitally (alternatively or additionally), for example by using an app that then serves as a fully digital identification card. For this purpose, the input and data collection module 24 has interfaces by means of which data is collected. In the process, information assigned to the user is retrieved from the memory module 22, in particular by accessing a database stored there. Furthermore, inputs are acquired from an authorized user who authenticates himself, for example, by logging in in a manner known per se. Further, other data sources may be accessed, such as specific databases stored and managed elsewhere than the memory module 22.

In another example embodiment, in step S1, the authentication and/or identification element 40 is not newly created, but has been previously created and is now updated.

The user may request a change to the data stored by the memory module 22 and/or the authentication and/or identification element 40 based on an input captured by the request module 26. Request data is created and based on the request data, the change is made, possibly after actuation by an approval authority, such as an authorized user.

Further, in an example embodiment, it is provided that an automatic update is performed. During the update, the data stored by the memory module 22 and/or the authentication and/or identification element 40 may be updated and/or modified. The automatic updating may be performed in various ways, such as at regular time intervals, on certain dates, on certain events, after certain events, or after certain events. Further, automatic updating may be performed when change data is provided by an external entity, such as when a database provides information that information assigned to the user there has been updated or changed.

In a further step S2, the verification module 30 captures the authentication and/or identification element 40. For this purpose, in the example embodiment, an image of the identification card is captured and information provided by a chip of the identification card is read out via wireless data transmission.

In the example, the information captured using the authentication and/or identification element 40 includes an identification number associated with the user.

Further, a validation step may optionally be performed in which an authentication of the identification card and the authentication and/or identification element 40 and/or the information provided thereby is performed in a manner known per se, such as by means of a cryptographic method.

In another example embodiment, the authentication and/or identification element 40 comprises a display element that is output on a display surface, such as by means of a user's mobile device. For example, an image or a graphical representation may be output.

In another example embodiment, the authentication and/or identification element 40 comprises digitally transmittable authentication and/or identification data, such as provided via near field communication (NFC).

In a further step S3, request data is generated by the verification module 30 and transmitted to the external server 20. The request data is generated based on the captured authentication and/or identification element 40.

In the example, the request data includes information captured by the authentication and/or identification element 40. For example, this may include an identification number of the user. Further, in the example, the request data comprises a condition to be verified with reference to the user.

In the example embodiment, the request data further comprises information about a certain category, whereby the user's membership in the category is to be confirmed. A positive confirmation corresponds to an authentication of the user, for example for participation in a sports competition. The request data can alternatively or additionally concern further features or feature categories, the presence of which is to be verified for the user.

In a further step S4, enable data is generated and transmitted to the verification module 30. In the example embodiment, this is done by the control module 28. Based on the request data, the data stored at the memory module 22 is accessed and it is verified according to the request data whether a certain feature of the user is present.

In the example, the release data includes information about whether a particular feature is assigned to the user, with this verified feature being defined in particular by the request data.

In the present example embodiment, the storage module 22 is centrally formed and is encompassed by the external server 20. This means in particular that during an authentication and/or identification process, the verification module 30 used in each case must establish a data connection to the external server in order to exchange data with it.

In further examples embodiments, a decentralized design of the memory module 22 may be provided. In this case, it is envisaged that a plurality of memory modules 22 are provided, which may at least partially store and provide the data necessary for authentication and/or identification. In one example embodiment, the memory module 22 may be at least partially comprised by the verification module 30 itself, such as an internal memory of the verification module 30.

In a further step S5, an output is generated and output by the verification module 30. In the example embodiment, the output is visually detectable and comprises a graphical display. This is colored in the example. Depending on the color displayed, for example, a positive or negative result of the verification may be indicated, whether a certain feature of the user is present, or whether the user is assigned to a certain group or not. The colors used can be green or red in the manner of a traffic light, but different color combinations can be used. Furthermore, a specific color, such as yellow, can be output if the result of the check is linked to conditions. For example, a user can be assigned to a group under the condition when a payment is made or when proof is provided that a condition has been met.

Various use cases for the system and the process are described below.

For example, the authentication and/or identification data 40 may include medical data of the user. For example, medically related restrictions and/or security-related data can be stored and provided if necessary. It is conceivable, for example, when the system is used in the professional sports sector, that the user is blocked in the event of corresponding medical diagnoses and the authentication and/or identification element 40 also maps this current state accordingly and thus prevents the user from being admitted to the event. It is conceivable in this context, for example in the field of motor sports, that the system keeps the corresponding data encrypted (e.g. secured by blockchain and/or other cryptographic methods) and either enables medical clearance or informs the user in the event of a check that the user is not permitted due to medical reasons.

For example, a digital licensing system can be provided (Digital Licensing), as is already done analogously in the areas of sports, golf, athletics and running or soccer (for example with player passes) or in the area of hunting, hunting permits, hunting licenses, gun ownership, sport shooters, or even fishing.

In particular, such a system can be implemented for motorsports, such as with a computer application that can generate and output a message (such as a push message) that a next level is reached after driving a certain number of further races, such as "3 more races to International B level". Furthermore, compliance with suspensions can be ensured.

Furthermore, the system can be implemented independently of concrete languages or for different languages, so that language barriers can be overcome. Since the authentication and/or identification element 40 is based on a data set, this can be standardized. In this context, it is further conceivable that a translation into several languages is also available in the system. Currently, with analog licensing systems, the problem arises in motor sports, for example, that the data sets are not harmonized, i.e. license classifications across national borders cannot be made without further ado, or translations and certifications must first be provided in a laborious manner. Due to tamper-proof procedures (e.g. by using cryptography and/or blockchain), the system now makes it possible for data records to be appropriately standardized, for corresponding translations to already be available in the system, and for certifications to be unnecessary. Thus, the language problem in the area of licenses is solved by standardized entries with standardized translation.

A use case of Digital Licensing can be performed for racers or teams.

The system may include a largely automated process, such as a one-time application and issuance of the authentication and/or identification element and subsequent automatic updating of the data. Implementation by means of computer programs and/or apps for mobile devices can allow rapid data entry.

The registration process can be seen in FIG. 3, for example:

In step S10, registration takes place ("Frist Time Registration/via Web or App"). In the example shown, the user's smartphone is held up to a registration station and the data exchange and registration process required for (initial) registration is started via NFC. The corresponding app of the system 10 is also already installed on the smartphone for this purpose.

In step S12, the registration process begins in the central server (so-called Creating individual Block (Genesis Block)). In this step, the authentication and/or identification element 40 is then also stored in the cell phone in the app such as the Apple Wallet.

In step S14, the annual renewal of the license can then take place ("Distribution of 5 License Instant in App Payment annual automatized distribution").

In step S16, S18 and S20 it is shown how the app, but also the central server, is updated accordingly ("Instant result and qualification analyzing") (=step S16).

In step S18, an update is triggered overall if there is new data and if there is an upgrade (e.g. new qualification, re-qualification, insurance renewal, fee payment, etc.) the license upgrade or refreshment (or license renewal) is then also triggered in step S20 in the app.

The registration process (=registration for a race) or digital licensing can be seen in FIG. 4.

In step S100, registration takes place using NFC at a registration station.

In step S102 this registration is processed (so-called "System Log").

In step S104 ("Briefing Attendance Authentication"), System 10 is used to verify that the user has attended the driver briefing.

After the race start, each lap is recorded in step S106 ("Each Lap Storing").

In step S108a, penalties and decisions are recorded ("Penalties/Steward Interaction").

In step S108b the results are transferred and stored.

In step S110, all data is updated everywhere.

In step S112, all data is saved and stored accordingly ("Update and Upgrade").

For example, the authentication and/or identification data collected may include names, addresses, memberships in clubs or groups, or results achieved in the past. It may further include medical information, with a scan and/or other supporting documentation as appropriate. Further, a grace period for subsequent submission of medical information may be required and implemented.

The storage module 22 can be designed in various ways. In particular, a decentralized "cloud" solution is conceivable. Furthermore, a database migration can take place, in particular for updating the data.

The input and data collection module 24 and the application module 26 may enable manual access, such as based on a login for an authorized user. In particular, access may be enabled via a web browser or other computer program or app.

The data associated with a user may include a mapping of an existing license or other evidence of specific information.

Further, the verification module 30 may be configured to contactlessly detect the authentication and/or identification element 40. This may, for example, implement contactless registration and enrollment of a subscriber.

Furthermore, authentication and/or identification can be performed using biometric data.

By simply updating the data at the memory module 22, for example, the respective licenses of the previous year can be assigned simultaneously to all users at the beginning of the year.

A payment system can be provided, whereby payment events are stored and taken into account for verifying authentication and/or identification and for generating the release. A sale of insurance and comparable products can also be implemented.

To ensure the integrity of medical data, provision can be made for a doctor's note or other certificate to be provided. Furthermore, a defined waiting period may be provided.

The system can further be used for registration in advance of an event to determine eligibility. In this regard, the data from the memory module 22 may be used to facilitate registration, particularly by means of an app or other computer application.

The authentication and/or identification data may include information about an acceptance.

The verification module 30 may detect the authentication and/or identification element 40 via near field communication (NFC), such as by holding a user mobile device against a reader and performing a read operation.

The input and data collection module 24 or other element may be connected to a timing system, a scoring system, and/or a database for providing competition data and, in particular, may perform automatic updates of the memory module 22 based on the provided data.

For example, in an athletic race, a system may capture data from each lap or run and store it associated with the driver. Furthermore, results of various sporting events and/or performance data can be stored and updated.

The user can access the data and, for example, as a driver, call up his lap times and evaluations as well as stored sporting achievements and performance data. It is conceivable that this functionality can be used for a fee, e.g. via in-app purchase or corresponding subscription.

When a new license level is reached, in particular after the user has fulfilled certain conditions, an alert may be issued indicating opportunities for the new license level, cross-selling if applicable, and/or a starter seat sale. Any purchase may also be rejected by the User. In one possible embodiment, the user also has the option to adjust the license level downward. It is conceivable, for example, that the license is adjusted downwards for cost reasons, e.g. because it is already clear that it is not required. However, it is basically ensured that the user never independently corrects the license upwards, unless the system legitimizes him to do so because he has achieved the respective qualifications, always considering the statute of limitations.

The user can already see in advance which requirements he has to fulfill for the next class, especially with hints on how these requirements can be fulfilled, for example by issuing a corresponding race selection.

An immediate purchase of the new license can be offered as soon as the authorization is available. If necessary, an automatic payment can be provided, for example via deposited credit card, Paypal or automatic debit order.

Existing permits, licenses or approvals (permits), such as a Nordschleifenpermit, can be issued to the user, for example in an app. Further, certificates may be loaded into the app, particularly to supplement or update the data in the memory module 22. A release from a course instructor may be required.

Criteria specified by an association, such as the FIA, can be checked automatically.

For example, for factory drivers, professional athletes or from certain qualification levels, an independent party can enter the data and the user can confirm these entries, in particular a racing driver. In this context, it is conceivable that driver classifications only apply to certain racing series and must be applied for separately at a cost.

The system may allow manual selective review of applications and/or licenses.

The user can be shown information about a marketing and there can be implemented possibilities to get in contact with the user, e.g. a driver or other sportsman. Advertising or a message can be output.

Registrations for specific events, such as races or events, can be made for the user by a promoter or organizer.

On race days or at the race weekend, the system can be used to simplify enrollment in the race, including the check of medical data. Accordingly, the acceptance can be carried out directly with the system, for example by means of corresponding checks of the authentication and/or identification element 40, possibly combined with biometric checks, comparable to an automatic passport control system at the airport. It is also conceivable that the authentication and/or identification element 40 is stored in the cell phone in an app such as Apple Wallet. Here, for example, a hash value is then exchanged via app with a corresponding reader or a connection is established via NFC or RFID or Bluetooth for the readout and check. This can also be used for checking attendance at driver briefings and safety briefings.

For some countries (e.g. Japan or USA) you need a special permission from your own ASN. This should also be able to be deposited on the license after application and payment. This can also be extended to corresponding super licenses, organizer licenses or special licenses for event locations or event series (e.g. Nordschleifenpermit DMSB, super license Formula 1, special license for special racing events, etc.).

Further, the authentication and/or identification element 40 may be linked to the official timing system and the scoring and competition data. In this regard, it is conceivable that data from each lap can be recorded and linked to the driver or rider. Further, sporting data and actions such as overtaking maneuvers, fastest laps, lap records, but also penalties or other performance data can be recorded.

This also allows the driver to view the lap times and also evaluations (comparison with own data, but also comparison with other participants).

The recording of penalties from warnings (point system) to license revocation or suspension must be possible on site from the official side (such as ASN/FIA). Since the penalties are usually pronounced with reservation and an appeal can be lodged, it must also be possible to remove them temporarily.

The result is unofficial immediately after the race and until the expiry of the protest period, only then the result becomes official and therefore binding. This changeover from unofficial to official result should take place automatically in the system. In principle, however, it must also be possible for data collection and data updating to be interrupted if there is a protest and this still needs to be clarified. This status can also be displayed. Furthermore, in this case, the system will correct the result at the request of the sports court/ASN/court or the correction can also be manually imported into the system by e.g. ASN or court (but not by the user himself).

Since license levels in motorsports are also linked to the achievement of sporting successes, the system can announce or display the achievement of a new license level accordingly. The new license level or license can be offered for purchase directly when the necessary requirements are met. It is conceivable that the corresponding fee for this can be paid directly via software on a mobile end device (so-called app) and corresponding electronic payment system (e.g. ApplePay, credit card, PayPal, payment service providers such as Stripe, Tencent WeChat (WePay), Alipay, etc.). It may be provided that the license does not have to be purchased directly and is held for purchase accordingly (provision of a license option).

The app can also enable corresponding permits (i.e. special licenses) to be visible in the app, such as the Nordschleife Permit (DSMB Permit Nordschleife (DPN)). This also applies to certificates or corresponding course credentials. It is conceivable that the course instructors will have corresponding upload options in the system for this purpose or that the course data will be uploaded after completion of a course.

It is also conceivable that the driver's classification can be displayed accordingly. To this end, it may be envisaged that criteria corresponding to or specified by the automobile sports associations are already implemented by the system and are reviewed automatically. Above a certain level of experience, e.g. for professional athletes or factory drivers, an independent party must enter the data and the data can then be confirmed by the user, for example.

The system 10 can be used as follows from the point of view of a national, but also international motorsport federation or an event organizer:

The licensing department can use System 10 to clarify issues in the licensing area (e.g., cross-border issues or non-harmonized issues). However, it is also conceivable that such issues can be clarified at the level of a superuser. In principle, associations and event organizers can be enabled to selectively review and grant applications and licenses.

Through the system, there may also be the possibility, e.g. via instant messaging, for licensors and licensees to communicate and exchange data directly with each other.

In this context, it is also conceivable that events such as racing events, test events, trackdays or the like are communicated directly to users via the system. Registration can then take place directly via the system.

System 10 can also be used to centrally manage and/or register races and events. This is particularly advantageous for cross-ASN promoters or organizers (ASN=Autorité Sportive Nationale). It would be conceivable, for example, for the data to be imported and also reported to the International Motor Sports Federation (FIA) via the system. A separate event organization module can be provided for this purpose, which is only made available to ASNs and/or promoters and/or event organizers, or to which only ASNs have access. Here, it can be further provided that event organization module is directly connected to the memory module and thus can match which authentication and/or identification elements have the corresponding qualification or licensing level to participate in the event. The appropriately qualified participants can thus be directly addressed and contacted for enrollment in the event.

However, the ASN is usually not a promoter or organizer. The ASN serves as an umbrella organization and sanctioning unit for the respective races, for example, there is no official approval for races in Germany without DMSB or, for example, formula races such as Formula 1 or Formula 2 or Formula 3 without the participation and supervision of the FIA. This is also mapped accordingly by the system and the ASN or umbrella organizations such as DSMB or FIA must make the event organization module available to the promoters and/or race organizers and/or race organizers.

Via the system 10, the organizers can also check the license verification of the participants in the race, e.g. by checking via RFID or NFC the authentication and/or identification elements 40. The acceptance and verification of locks and also the mandatory medical check can also be performed in this way.

Lap times and positions achieved during the event can be tracked. In this context, it is conceivable that the authentication and/or identification element 40 is combined with a GPS module or another location-based service application (LBS-Application). Either the authentication and/or identification element 40 has this or is in connection with such a module.

The system can also have a driver recognition function for races with multiple drivers on one car (such as an endurance race). Race control, for example, monitors the currently active drivers anyway and can feed this information into the system accordingly.

The system 10 may also be set up to transmit real-time, lap-accurate times and positions to the ASNs, the data stores (e.g., a cloud) of FIA or the organizer. Detailed performance data and positions can also be sent to the data stores of the umbrella organization or world federation or a higher-level organization.

The advantage is that in this way the preliminary results are available directly after the race and can also already be linked to the authentication and/or identification element 40 in the system 10. It is further conceivable that the results can be disputed by the user via a dispute module of the system 10. The result must be set to official or is automatically set to official if no dispute is made.

In the event of an accident or medical emergency, the use of the system 10 and the authentication and/or identification element 40 results in the following possible use, as shown in more detail in FIG. 5:

An accident has occurred in step S200.

This is also immediately detected and reported and in the next step S202—e.g. in the case of a race event or other sporting event alerted by the organizers (Medical Delegate, Race control, Stadium Operator, Medical Supervisor, etc.)— the emergency medical personnel is sent to the accident site or to the injured person for first aid and emergency care.

In the example shown, in step S204, the Medical Delegate sends the medical data of the injured participant to the mobile device (e.g., smartphone or other mobile device) of the physician or paramedic.

Using the system 10, in step S206 the physician or the paramedic provides the information concerning the person who has had the accident, in particular the language skills of the person who has had the accident, previous illnesses or the like. In principle, however, it is also conceivable that step S202 is already influenced in such a way that, on the basis of the data of the person involved in the accident, first-aid personnel with appropriate language skills or also appropriate special equipment (in order to be able to react to pre-existing conditions if necessary) are already dispatched.

Steps S204 and S206 could also run in such a way that they already take place during the alerting in step S202, i.e. steps S202, S204 and S206 run simultaneously or combined.

As a result, significantly improved first aid based on more information can be provided and delivered in step S208.

In particular, medical personnel have the option of obtaining personal data via RFID or NFC (e.g., by reading information from a code or the app of the person involved in the accident) or already via their own app in step S206. These can contain corresponding information on previous illnesses, on the patient's history, on the blood group or simply on the language or language skills of the injured user (e.g. in which language must the patient be addressed?).

The aim here is to optimize initial care at the scene of an accident. At every racing event, appropriate medical care and, in particular, appropriate emergency medical care must be provided depending on the hazard potential. Here, the system can be used very profitably. In particular, it is conceivable that an official of the ASN, e.g. of the DMSB or the FIA or another appropriately commissioned and authorized person or a corresponding group of persons, has authority to access the system and the medical data of e.g. the drivers. In the event of an accident, the data of the driver involved in the accident (name, language (for addressing), blood group, accident history (as much as possible, e.g. known vertebral injuries, etc.)) is communicated to the emergency physician and the paramedics who are on their way to the scene of the accident, so that first aid can be optimized on site. Here, ideally, the medical record should be accessed, alternatively, in addition to the information provided by the Medical Check, the driver should provide as much information as possible himself in his own interest. The medical delegate (e.g. at the DSMB a DSMB official) must also have the authority after written confirmation of the doctor to withdraw the release of the driver at this event and beyond, until an examination in which the driver is declared fit to race again.

The data is loaded into the system for the respective event during registration via app (NFC or barcode) and thus represents the so-called paper acceptance, which takes place before the start of the event.

Penalties from the race can also be entered directly into System 10. This can be done, for example, via corresponding accesses for Race Control or referees. A separate trusted-referee-input module may be provided for this purpose. In summary, the current situation and the improvement to be achieved by the invention can be described as follows:

The digital licensing according to the invention using the authentication and/or identification system 10 according to the invention for authenticating and/or identifying a user is a product which is intended to digitalize the entire licensing system in sports (amateur/professional)—and beyond. Based on a specially developed blockchain or distributed ledger technology, this system should or will in the future enable the entire processes contactless and in real time.

Is state:

Today, the licensing system of almost all sports associations is still handled in paper form. Applications for licenses still have to be submitted in paper form in many cases (alternatively also partly via the web). This process is very time-consuming and personnel-intensive. In many cases, payment for the license is made only after receipt of the invoice. On the web, payment by credit card is usually also possible. However, some documents still have to be submitted in original (e.g. a medical examination).

Furthermore, the process of the respective sporting events is antiquated, requires a lot of paperwork and is associated with a lot of effort. This entire process of naming up to the license control, the transmission of the results and the resulting data generation and utilization for databases or analysis, is to be integrated into the system. The end user should be able to control his entire license and event management via an app.

As a final point, the flow of information for medical first aid on site (especially at car races or bicycle races—see FIG. 5) has not yet been optimized. This field lies completely fallow, medical aptitude tests mostly only serve to legally secure the associations.

Target state or use of the system according to the invention 10:

As already mentioned, the Digital Licensing product, based on distributed ledger technology/blockchain, is intended to digitize, automate and revolutionize the entire licensing system in a contactless manner.

The entire process is to be set up as a blockchain or DLT. Since globally the entire federations of the respective sport (DMSB, DFB etc) as well as the respective umbrella organizations (FIA, FIFA etc) are available as hosts, a decentralized system can be developed specifically for this (this applies to each individual sport).

The entire process is to be automated as follows: The users will be provided with an app with their respective authorizations and information (status) in order to be able to manage their license and sports events themselves.

This starts with the application for the license (or the first application) (see FIG. 3). The further following process will take place automatically. In most sports the license is valid from 01.01. –31.12. (start of calendar year until end of calendar year), with the Digital Licensing System the license will be automatically provided to the user on 01.01. (today the user has to apply for the license every year in a time-consuming process). Furthermore, in many sports there are different levels of licenses, with the respective authorizations (eg motorsport license Nat D, C, B, A, Int C, B, A issued by the DMSB). We can also take the handicap in golf as an example. Achieving a higher level or a better handicap is a key based on many different factors including, among others, results processed live in the system. These complex conditions, which differ in different sports, are automatically processed and verified by the system, so that when the user reaches the new level, he immediately gets it. As of today, he has to prove this himself and apply for it manually.

The user will be able to use the Digital Licensing Tool not only to manage the license but also to enroll in the sanctioned events that will be listed there. On site, he will be able to perform the document check contactless via NFC/Bluetooth/QR Code technology in the future. The verification of meetings requiring attendance (which today is confirmed by signature) is to be performed contactless by identification number via cell phone using BLE (Bluetooth Low Energy)—similar to the Corona app—this works particularly well for large events.

Beyond this function, all results are collected and processed in the system after registration at the respective event. In motorsports, every lap time and in golf every stroke is stored in order to be able to process the necessary information for the licenses (levels/handicap). Furthermore, data from this should flow to databases and an analysis tool should be made available to the users (athletes, coaches, sponsors, etc.). In the license information of the user, health data/accident histories and other information will be stored to optimize medical first aid on site. This applies especially to sports such as motor sports, cycling or skiing where the accident victim is immediately identifiable.

In the event of an accident, the emergency doctor on the way should be provided with the necessary information from the driver in order to be able to provide the best possible first aid on site. This includes, for example, information on the driver's address (at international events), which language he speaks, blood group, allergies, accident/injury history (e.g. someone who has already had a vertebral fracture must be rescued with increased caution even in a supposedly minor accident situation). This information will be automatically integrated and updated in the future. Furthermore, the annual medical checks are to be transmitted directly from the responsible doctor to the association, so that this can be done paperlessly; this data is cryptographically secured in the blockchain accordingly.

On site, the system will also be used to enable master users (e.g. sports commissioners) to activate penalties up to and including license revocation. Especially in the area of authentication, we want to use the entire state of the art. This includes biometric methods (fingerprint, face recognition) including retina scan.

Numerous functions of the system (applying for licenses, license upgrades, registering for events) also require a payment function. This is to take place via various inApp Payments, so that an accelerated payment takes place here. The global market is considered here (credit cards, PayPal, Stripe, WeChat and Alipay).

Finally, the system will completely replace and automate the current licensing system, which will lead to increased efficiency and transparency. The sports authorities will need far fewer staff for the licensing departments, the frequency of errors or even fraud will be completely eliminated. The sports authorities get reliable data, can even make economic forecasts based on it (each higher license level usually costs more money). Due to the system there will be a faster receipt of money. Furthermore, the sports authorities will save costs for plastic cards and related logistics.

In the case of an implementation of a digital or electronic sports equipment or sports device passport, the use of the system 10 and the authentication and/or identification element 40 results in the following possible use, as shown in more detail in FIG. 6:

In step S300, the first step is to provide or select and provide a sports device, e.g., in the form of a race car, for authentication and identification (or, comparably in equestrian sports, to select and provide a horse accordingly for authentication and identification), or a sports equipment (e.g., a saddle for a horse), or, which is usually done at the beginning of a sports event.

The authentication and/or identification element 40 is preferably designed as a so-called digital or electronic motor vehicle passport (is also called a car passport in racing) for a racing car and is attached thereto (e.g. by a hidden or irreversible attachment) and is implemented by means of the system 10.

Within this digital vehicle passport, so-called vehicle passport data such as vehicle owner data, vehicle data, homologation data, vehicle changes or historical and current telemetry data, etc. can be stored and saved. These data can be linked with those of the athlete (driver).

This can be done in a comparable way in equestrian sports.

In step S302, the registration is then performed, e.g. by means of NFC or other wireless connection solutions (as described above), by means of a registration device (which may be designed as a mobile terminal) of a technical and/or official sports regulatory authority (e.g. the FIA).

In step S302, in particular, the digital carriage passport data is read out so that it serves as the basis for registration.

In addition, in step 302, write operations may also be performed within the vehicle pass by the registration device, for example in the form of an approved or successful registration, which is automatically stored in the vehicle pass for documentation purposes.

In step S304, this registration is further processed by the system 10 (so-called "system log"), as already described above.

In step S306, after the race start of the vehicle (or e.g. a race horse), on the basis of each lap is recorded and stored or deposited in the car passport or sports equipment passport by means of real-time data of the vehicle such as telemetry data, timekeeping, driver data ("live data").

Then, additionally according to step 308, by means of wireless connection (e.g., by means of 5G or other connections as described above), this real-time data is transmitted to another terminal (preferably encrypted as described above) to another terminal.

This terminal device can be that of step 304, although it can also be an additional terminal device, e.g. a mobile terminal device of the vehicle owner or spectator. Here, in the respective apps, a fan engagement can be enhanced by augmented reality.

Here, the registration of a racing vehicle but also its history (race laps driven, race statistics, accidents, drivers, etc.) is to be optimized and a complete and forgery-proof provision of the car passport data is to be guaranteed. In particular, it is conceivable that an official of the ASN, e.g. of the DMSB or the FIA or another appropriately commissioned and authorized person or a corresponding group of persons, has authority to access the system and the vehicle passport data in order to avoid contradictory information on the car passport data as far as possible.

In equestrian sports, the respective basic data on the horse should also be stored. In addition, the certified veterinarians should also receive write authorization to store medical data and vaccinations.

Penalties from the race can also be entered directly into the system 10 or into the vehicle passport. This can be done, for example, via corresponding accesses for Race Control or referees. A separate trusted-referee-input module can be provided for this purpose. In summary, the current situation and the improvement to be achieved by the invention can be described as follows:

The digital licensing according to the invention using the authentication and/or identification system 10 according to the invention for authenticating and/or identifying a user is a product which, as described in connection with FIG. 6, is intended to digitalize the entire licensing system in sports (amateur/professional)—and beyond. Based on a specially developed blockchain or distributed ledger technology, this system should or will in the future enable the entire processes contactless and in real time.

In the case of an implementation of a digital sports equipment or sports equipment passport together with a so-called tokenization of an asset class ("tokenization of asset), the use of the system 10 and the authentication and/or identification element 40 results in a further possible use, as shown in more detail in FIG. 7:

In the Step S400 it is first about providing a sports equipment (e.g. a saddle for a horse) or in particular a sports equipment in the form of a racing car, horse, which is usually done at the beginning of a sports event.

In step S402, an asset class is then tokenized (e.g., the race car as shown in FIG. 7, although other assets such as company shares, goods, physical objects, rights and licenses can also be tokenized. Here, digital representations of an asset, including the corresponding rights and obligations, are mapped in the form of tokens as part of this process. The generated tokens represent the ownership rights to the respective assets or assets and are stored in a decentralized database, e.g. the blockchain).

In principle, tokens represent a security of their own kind, since tokenization means that they are assets that can be traded on the financial market and must be classified as securities.

Thus, the authentication and/or identification element 40 may comprise a physical or virtual token. A token may be an object to which the function of the authentication and/or identification element is attached. A token may further comprise a virtual object, such as a signature file, one or more hash values, a password, an image, a file, or other object. In the case of a virtual token, a cryptographic method may further be used, particularly to confirm the identity of a user, such as when the user is required to provide a password, or to ensure that the token is current and not out of date.

The generation or provision of such a token can be done, for example, wirelessly via WiFi, via Bluetooth, or even via RFID or NFC to multiple corresponding mobile user terminals, which the system 10 implements according to step 404. In particular, the tokens may be linked to the car passport data by the system.

In order to determine the price or value of the tokens or to create a valuation basis for the tokens, the system 10 can refer to the continuously updating car passport data and provide it to the token holders via their mobile devices according to step 406 as described above, so that the token holders (e.g. racing fans) according to step 406 can participate in the success (but also in the failure) of this tokenized asset class during its investment lifetime (e.g., a racing car in Formula 1) and racing drivers (e.g., a Formula 1 team) can generate additional revenue streams using the authentication and/or identification system 10 according to the invention.

The digital licensing according to the invention using the authentication and/or identification system 10 according to the invention for authenticating and/or identifying a user is a product which, as described in connection with FIG. 7, is intended to digitalize the entire licensing system in sports (amateur/professional)—and beyond. Based on a specially developed blockchain or distributed ledger technology, this system should or will in the future enable the entire processes, in particular also the tokenization, contactless and in real time.

LIST OF REFERENCE SIGNS

10 System
20 External server
22 Storage module
24 Input and data collection module
26 Application module
28 Control module
30 Verification module
40 Authentication and/or identification element
S1 Step S1
S2 Step S2
S3 Step S3
S4 Step S4
S5 Step S5

S10 Step S10
S12 Step S12
S14 Step S14
S16 Step S16
S18 Step S18
S20 Step S20
S100 Step S100
S102 Step S102
S104 Step S104
S106 Step S106
S108a Step S108a
S108b Step S108b
S110 Step S110
S112 Step S112
S200 Step S200
S202 Step S202
S204 Step S204
S206 Step S206
S208 Step S208
S300 Step S300
S302 Step S302
S304 Step S304
S306 Step S306
S308 Step S308
S400 Step S400
S402 Step S402
S404 Step S404
S406 Step S406

The invention claimed is:

1. An authentication and identification system for authenticating and identifying a user in the field of semi-professional or professional sports, comprising:
at least one memory to store and/or provide identification data and authorization data assigned to a user, wherein the at least one memory is configured to store personal data of the user, information about a past participation of the user in sport events and results obtained, and an assignment of the user to certain groups or categories of users;
at least one authentication and identification element uniquely assigned to a user;
at least one input and data collection interface configured to capture and/or read data, which is not accessible to the user and by means of which the authentication and identification element can be created and changed;
at least one output display configured for authentication of the user for sport events;
at least one verification reader configured to verify the authentication and identification element, wherein, the at least one verification reader is implemented as software of a reader comprising a sensor and a processor, and wherein the at least one verification reader is configured to display authentication results for event access; and
a timing system, a scoring system and/or database that is connected to the at least one input and output interface to transmit data changes and competition data, wherein the at least one memory is configured to be automatically updated based on data received from the timing system, a scoring system and/or database.

2. The authentication and identification system according to claim 1, wherein the at least one memory is designed as centralized and decentralized memory.

3. The authentication and identification system according to claim 1, wherein the authentication and identification element consists of a data record, in particular electronic and digital data record, created by means of the input and data collection interface configured to capture and/or read data.

4. The authentication and identification system according to claim 1, wherein the authentication and identification system has at least one verification reader configured to capture the authentication and identification element.

5. The authentication and identification system according to claim 4, wherein the verification reader is arranged to generate request data on the basis of a detected authentication and identification element and to transmit said request data to the memory, wherein the system is configured to generate approval data on the basis of inquiry data and the data on the respective user held in the input and data collection interface configured to capture and/or read data, and to forward it to the verification reader for verification.

6. The authentication and identification system according to claim 5, wherein the request data generated by the verification reader comprises an assignment of the user to a specific category.

7. The authentication and identification system according to claim 6, wherein the authentication and identification system is set up to generate at least partially the request data and a release data by means of a cryptographic method, in particular a blockchain method.

8. The authentication and identification system according to claim 7, wherein the verification reader is further adapted to generate and output a release information based on a received release data.

9. The authentication and identification system of claim 8, wherein an authorization output comprises a graphical authorization signal element comprising a color output parameter formed as a function of a authorization data.

10. The authentication and identification system according to claim 9, wherein the system is configured to detect a user input, to generate change data as a function of the user input, and to change authentication and identification data stored in the memory module on the basis of the change data.

11. The authentication and identification system according to claim 1 configured for determining a user's eligibility to participate in an event, wherein the event is a sports event.

12. The authentication and identification system according to claim 1 configured for implementing a digital and electronic sports equipment and sports device passport, in particular a motor vehicle passport.

13. A method for authenticating and identifying a user in the field of semi-professional or professional sports, comprising:
uniquely assigning an authentication and identification element to a user using
at least one input and data collection interface configured to capture and/or read data, which is not accessible to the user and from which the authentication and identification element can be created and changed;
reading out and displaying the authentication and identification element using at least one output display;
verifying the authentication and identification element; and
using a timing system, a sensory system and/or database connected to the input and output interface configured to capture and/or read data, to transmit data changes and competition data, wherein the at least memory is configured to be automatically updated based on data received from the timing system, a scoring system and/or database.

14. The method according to claim 13, wherein the method is performed using the authentication and identification system according to claim 1.

* * * * *